July 1, 1924.

F. CREEDY 1,499,853

MULTISPEED DYNAMO ELECTRIC MACHINE

Filed Feb. 17, 1920   6 Sheets-Sheet 3

Inventor
Frederick Creedy
per Eugene C. Brown
Attorney

July 1, 1924.
F. CREEDY
1,499,853
MULTISPEED DYNAMO ELECTRIC MACHINE
Filed Feb. 17, 1920   6 Sheets-Sheet 4
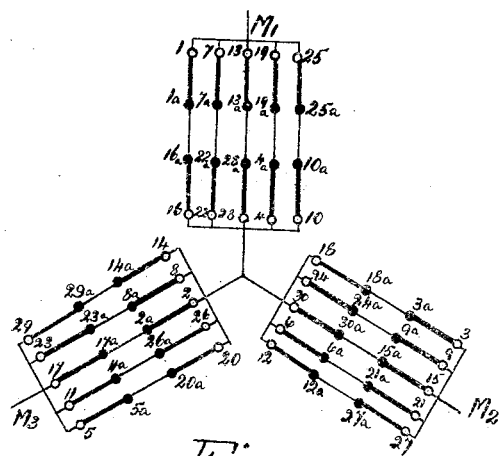
*Fig: 11.*
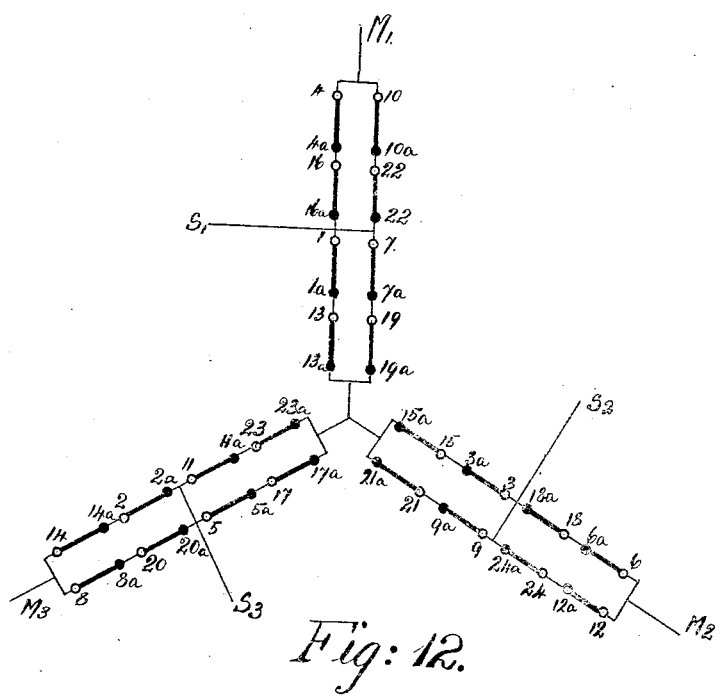
*Fig: 12.*
Inventor
Frederick Creedy.
per Eugene C. Brown
Attorney

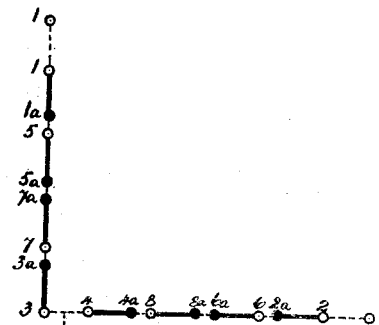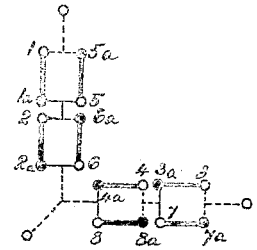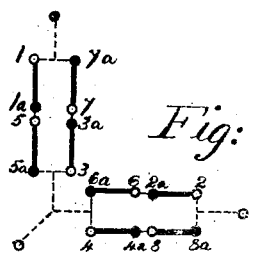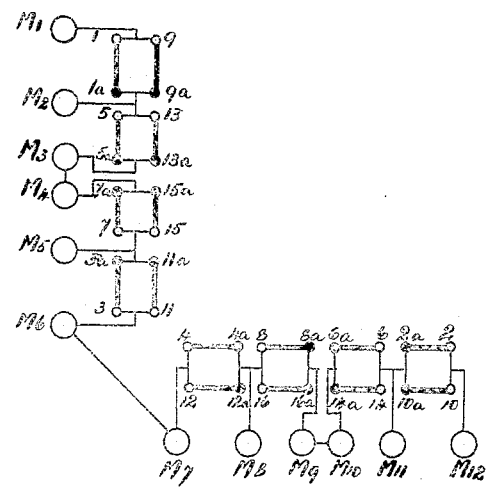

July 1, 1924.  
F. CREEDY  
1,499,853  
MULTISPEED DYNAMO ELECTRIC MACHINE  
Filed Feb. 17, 1920  6 Sheets-Sheet 6

Fig. 18.

Close E & G for 32 poles  
" F & H " 16 "  
" I, J & B " 12 "  
" D " 8 "  
" A " 6 "  
" C " 4 "

Inventor  
Frederick Creedy  
Per Eugene E. Brown  
Atty

Patented July 1, 1924.

1,499,853

UNITED STATES PATENT OFFICE.

FREDERICK CREEDY, OF YORKSHIRE, ENGLAND.

MULTISPEED DYNAMO-ELECTRIC MACHINE.

Application filed February 17, 1920. Serial No. 359,311.

*To all whom it may concern:*

Be it known that I, FREDERICK CREEDY, a subject of the King of Great Britain and Ireland, residing at 10 Ashburn Place, Ilkley, Yorkshire, England, have invented new and useful Improvements Relating to Multispeed Dynamo-Electric Machines, of which the following is a specification.

This invention relates to alternating current induction motors of variable pole number.

It consists in equipping both the stator and rotor with windings each capable of direct excitation from a polyphase line, and producing fields of different numbers of poles, and in adapting each of these windings to serve as a secondary when the other is excited from the line.

If desired the stator may carry a plurality of windings giving different pole numbers, or a winding or windings each capable of modification to produce two or more different pole numbers; in such case the rotor winding is adapted to serve as a secondary on two or more numbers of poles.

Generally speaking the terms stator and rotor are interchangeable in this specification. What is proposed in respect of one member is applicable also to the other, subject to obvious practical limitations; the rotor is in motion, and so it is relatively difficult to make and vary connections between its windings and external conductors; and it has frequently less slot space than the stator for accommodating windings.

Further both parts of a machine may carry more than one winding, or be adapted to act as primaries for more than one pole number.

Methods by which windings may be designed or adapted to serve as primaries on more than one pole number are disclosed in my prior Patents Nos. 1,291,424 and 1,418,779.

The accompanying drawings illustrate the explanation given below of the conditions that windings must fulfil if they are to serve satisfactorily as secondaries, and if they are not to interfere with the action of other windings; and the explanation of the methods by which windings may be designed or adapted to meet these conditions.

In the first place a winding will only act satisfactorily as a secondary if the inducing field generates in it approximately balanced polyphase currents.

If the number of uniformly distributed sections of the secondary is equal to the number of poles in the inducing field, the phase difference between neighbouring sections will be 180°, and the secondary currents will be single phase. That is not satisfactory. While there is no definite limit beyond which a winding is impracticable the phase difference between neighbouring sections should preferably not exceed about 120°. Therefore a first condition is that the number of sections of the secondary should not be much below three times the number of pole pairs in the inducing field.

A section is the portion of a winding producing a zone or band of current of a particular phase, that is it consists of one or more consecutive coils or bars joined in series and all carrying the same current when the winding acts as a primary. In a primary winding the number of sections is determined by the number of phases and the number of poles; in accordance with the rule $\frac{360° \times \text{pole pairs}}{\text{sections}} = $ phase difference between adjacent sections; though as shown in my patent application No. 276263 the number of phases in the winding may exceed the numebr of phases in the supply. The phase difference must be either 60° or 120° on three phase supply and 90° on two phases. The ends of a section are the points at which the current changes phase on the primary pole number or numbers.

If a given primary winding has not sufficient sections to enable it to act as a secondary upon a particular pole number, the sections must be increased in number by the provision of connections between points in the winding intermediate between the ends of existing sections. i. e. between points at which there is no change of phase of current on the primary pole number or numbers. The choice of such points will depend on the manner in which it is proposed to connect the sections.

One widely applicable method of adapting a winding to serve as a primary on one pole number and as a secondary on another is to connect all its sections in star, and to join in parallel all the sections which are supplied from any one phase of the mains when the winding acts as a primary. Sections having currents in opposition of phase may be joined in parallel if the one section is reversed with respect to the other.

Fig. 1 shows the effective relative disposition of the sections of a three phase 4 pole primary winding adapted to serve as a secondary on 2, 6 or 8 poles, and Fig. 2 shows the connections of the sections;

Fig. 3 shows the effective relative disposition of the sections of a winding of six sections connected to act as a primary on 2 poles and as a secondary on 4 poles, and Fig. 4 shows the connections of the sections;

Fig. 5 shows a modified winding to serve as a primary on 4 poles and as a secondary on 2 poles;

Fig. 6 shows a winding adapted to act as a primary on 4 and 8 poles as a secondary on 6 poles;

Fig. 7 illustrates how a winding may be connected so that the number of the sections when acting as a secondary may differ from the number of sections when it acts as a primary;

Fig. 8 represents in a manner similar to Fig. 1 the effective relative disposition of the sections of a winding adapted to act as a primary on 4 and 8 poles and as a secondary on 6 and 12 poles;

Figs. 11 and 12 show windings to be combined with the winding shown Figs. 8 and 9 to produce a five speed motor;

Fig. 13 shows a two phase winding connected to act as a primary on 4 poles; and Fig. 14 shows it connected to act as a primary on 2 poles;

Fig. 15 shows an alternative arrangement of the winding illustrated in Fig. 13;

Fig. 16 shows a similar two phase winding arranged to act as a primary on 8 poles and a secondary on 6 poles;

Fig. 17 shows it arranged to act as a primary on 4 poles and as a secondary on 6 poles; and Fig. 18 shows the stator and rotor windings of a six speed motor.

Figure 9:
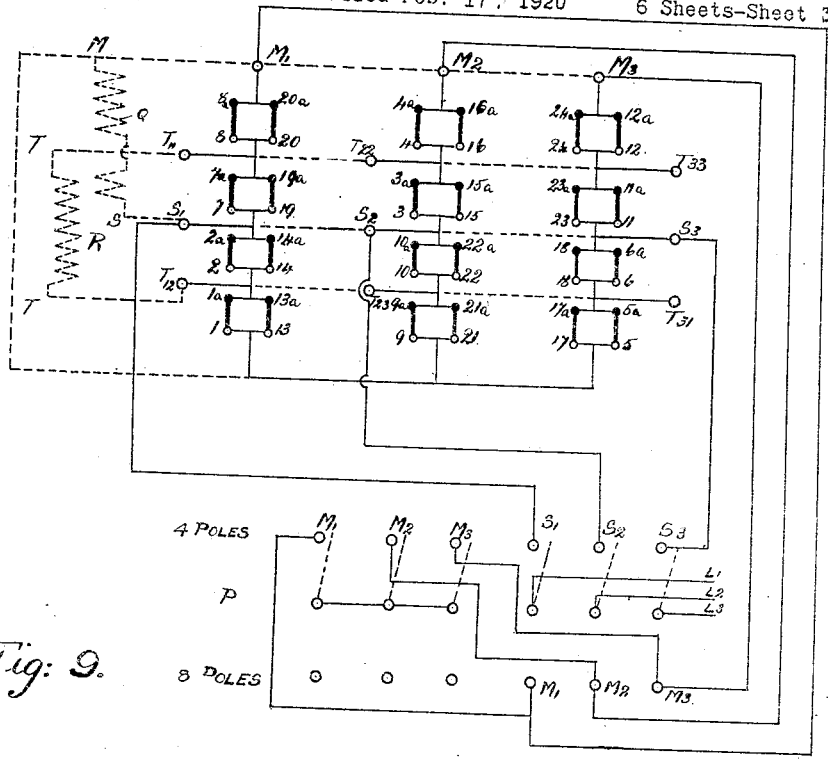
Fig. 9 shows the connections of the sections, and Fig. 10 an alternative scheme of connections.

Figures 1 and 2 are diagrams of a 3-phase 4-pole primary winding of 12 sections. This is adapted to act as a secondary on 2, 6 or 8 poles; and only fails to be altogether suitable for 10 poles on account of the insufficient total number of sections. Figure 1 shows the effective relative disposition of the sections on the periphery of the machine, and Figure 2 their connections. The sections are numbered consecutively around the machine, one end of each being numbered 1, 2, 3, .... and the other $1^a$, $2^a$, $3^a$ .... so that Figure 2 may show the relative reversal of half the sections. Each parallel-connected group it will be seen is made up of sections evenly spaced around the periphery of the machine. Each section also bears three numbers; for example, section 2, $2^a$ bears the numbers 30, 60, 120, these numbers indicate the phases of the electro motive forces across the section on 2, 4 and 8 poles assuming the phase of the electro motive force across section 1, $1^a$ to be 0.

Another method of wide application is to connect successive sections together so that the winding is continuous around the periphery of the machine, and to provide such a number of chord connections as are necessary to complete secondary current paths. This methods is typically represented by an ordinary lap winding with chord equalizers wound for the primary pole number and having sufficient equalizers to divide the winding into the number of sections requisite for the secondary pole number. The equalizers join points which are at the same potential when the winding is acting as a primary.

It is now to be noted that the connections by which a winding is adapted for use as a secondary fall into two classes. Secondary current paths in which on the primary poles number or numbers the E. M. F.'s total to zero, to which class the cases so far considered belong, may be permanently closed; that is to say, they may be completed by internal connections; because their existence does not affect the action of the winding as a primary. Secondary current paths in which there is a resultant E. M. F. on the primary pole numbers can only be closed when the winding is to act as a secondary, and must therefore be completed by connections external to the winding. If, however, rheostatic control is wanted, then all secondary current paths must be completed through the external rheostats, irrespective of their condition on the primary pole members.

In view of the value, especially for rotor windings, of a winding which can serve as a primary on one pole number while permanently connected to serve as a secondary on another pole number, it is important to consider for what pole numbers it is possible so to arrange a winding. Discussion of a few specific examples will make clear certain general rules governing the design of windings. In this discussion the number of poles which the winding is to produce as a primary is referred to as the primary pole number, and the number of poles in the field to which it is to act as a secondary as the secondary pole number.

If the total number of sections is even, there will be sections diametrically opposite. If the primary and secondary numbers of pole pairs are prime to one another and not both odd, these diametrically opposite sections will be in phase (i. e. will carry currents in phase) with one another for the even number of pole pairs, and in opposition of phase for the odd number of pole pairs. Two examples are seen in Figures 3, 4, 5, and 1. Figures 3 and 4 show a winding of six sections connected to act as a primary on 2 poles and as a secondary on 4 poles. On the primary pole number sections 1 and 4, for instance, are in opposition of phase, and may therefore be connected in parallel relatively reversed. On the secondary pole number these sections are in phase, so their E. M. F.'s add in the closed local circuit. Figures 5 and 1 show a winding of 12 sections connected to act as a primary on 4 poles and as a secondary on 2 poles. So a two speed motor may be had by placing the winding of Figure 4 on the rotor and the winding of Figure 5 on the stator. It is to be noted that since on 4 poles, which is the primary pole number for Figure 5, sections 1 and 4 are in opposition of phase, and sections 7 and 10 likewise, and so on, these sections may be joined in series in pairs relatively reversed; but to connect the pair 1, 4 in series, and the pair 7, 10 in series, and then merely join the whole group 1, 4 in parallel with the whole group 7, 10, and so on, would not make a satisfactory secondary for 2 poles; 1 must be joined in parallel with 7, 4 with 10, and so on, as shown.

If the two numbers of pole pairs are not prime to each other, the periphery of the machine will have a number of identical divisions equal to the greatest common measure (G. C. M.) of the two numbers of pole pairs, to each of which a rule like that which begins the last paragraph will apply. If the total number of sections is divisible by twice the G. C. M. mentioned, there will be sections half a division apart; and these (instead of sections half the whole periphery apart) will be in phase for one pole number and in opposition of phase for the other, so long as the two numbers of pole pairs when divided by their G. C. M. give in the one case an odd and in the other an even quotient. For instance for 6 and 12 poles the winding will have 3 identical divisions, and sections $\frac{1}{6}$ of the whole circumference apart will be in phase on one pole number and in opposition of phase on the other. Moreover sections $\frac{1}{3}$ of the whole circumference apart will have the same phase (as each other) on both pole numbers and may be connected in sets of three in series.

It is apparent then that if all the primary pole pairs which a winding is to serve are even, and all the secondary pole pairs odd, or if all the primary pole pairs are odd and all the secondary pole pairs even, the winding can be adapted to act as a secondary by connection of its sections in pairs in parallel.

It is therefore possible, by the methods so far described alone, to construct a wide range of motors giving two or more speeds. Where more than two speeds are needed either the stator or rotor (or both) may carry a winding adapted for two or more primary pole numbers, of which there are many types. For the rotor those windings are best suited which require relatively few terminals, and relatively few slots. Suitable types are those which give two pole numbers having a ratio of 2:1, the sections being connected into a mesh or in series in a star for one pole number and in two parallels in star on the other. Figure 6 is an example. A winding of 12 sections as represented in Figure 1 is joined in a mesh, each limb of which comprises two pairs of parallel sections joined in series. The angles of the mesh and the mid points of its sides are joined to slip rings $M_1$, $M_2$, $M_3$, $S_1$, $S_2$, $S_3$, six in all. A switch S enables the angles of the mesh to be joined to three phase mains $L_1$, $L_2$, $L_3$, when the winding gives 8 poles, or the mid points of the sides to be joined to the mains and the angles short-circuited, when the winding gives 4 poles. The internal connections of the sections into parallel pairs, which distinguish the winding from the known type, enable it to act as a secondary for 6 poles.

Reference has already been made to the necessity of a sufficient number of sections in the winding. Whenever the ratio of the primary and secondary pole numbers for which a winding is to serve exceeds 2:1, as will often happen in a 3 or 4 speed motor, this need will become apparent. For the number of sections in a primary winding is determined by the number of poles and the number of phases; though as appears from my Patent No. 1,418,779 and from the examples herein described, the number of phases in the winding may exceed the number of phases of the supply. For instance if a motor is required to operate on 4, 6, 8 and 12 poles one member may be equipped with a winding serving as a primary on 4 and 8 poles, and the other with a winding serving as primary on 6 and 12 poles. But the normal 4 and 8 pole winding would be a winding of 12 sections, having 6-phase currents in it when producing a 4-pole field, and 3-phase currents when producing an 8-pole field. A winding having 12 sections acting as secondary in a 12 pole field no matter how connected can have only single phase currents generated in it. But opposite sections of the winding will be in phase with each other on both primary pole numbers. Therefore the midpoints of opposite sections,—or any corresponding points, as points $\frac{1}{3}$ from the end of a section—will be equipotential points on both primary pole numbers and may be permanently joined without affecting the action of the winding as a primary. Two such sections are shown in Figure 7. Equalizers $a$, $d$ and $c$, $f$ connect the sections in parallel. Additional equalizers such as $b$, $e$, in effect make the winding one of 24 sections on 12 poles, enabling 4-phase currents to be generated.

The examples examined show that the number of parallels in a secondary winding may vary from 2 (e. g. Figures 4 and 5) to the total number of sections per primary phase (e. g. Figure 2). How many parallels there must be for any particular pole number, or in other words for what pole numbers a particular number of parallels is suitable, may be deduced from general considerations.

The sections joined in parallel must be in phase (or in opposition of phase if relatively reversed) on all primary pole numbers, and on all secondary pole numbers must form a balanced polyphase system or set of polyphase systems.

Assuming first that the sections are connected in parallel without relative reversal. Then $r$ evenly spaced sections so connected will be in phase on $n\,r$ pole pairs ($n$ being any integer); and on $p$ pole pairs ($p$ being an integer not a multiple of $r$) if the G. C. M. of $p$ and $r$ is $y$ there will be $y$ independent polyphase systems of $\frac{r}{y}$ phases each; because the systems are independent the sections may in such case be joined $y$ in series and $\frac{r}{y}$ in parallel. Expressed as a table this rule, already set forth in my specification No. 276263 gives the following results:—

*Sections connected in parallel without relative reversal.*

| r=number of evenly-spaced sections which may be connected in parallel. | Winding can be used as primary on $n\,r$ pole pairs, $n=$ | and as secondary on $p$ pole pairs G. C. M. of $p$ and $r$=number of independent systems= | | | | | | |
|---|---|---|---|---|---|---|---|---|
| | 1 | 2 | 3 | 4 | 1 | 2 | | 3 |
| | | | | | Value of $p$. | Value of $p$. | Minimum number of parallels. | Value of $p$. | Minimum number of parallels. | Value of $p$. | Minimum number of parallels. |
| 2 | 2 | 4 | 6 | 8 | all | | 2 | | | | |
| 3 | 3 | 6 | 9 | 12 | all | | 3 | | | | |
| 4 | 4 | 8 | 12 | 16 | all other | | 4 | 6, 10, 14, 18, etc. | 2 | | |
| 5 | 5 | 10 | 15 | 20 | all | | 5 | | | | |
| 6 | 6 | 12 | 18 | 24 | all other | | 6 | 4, 8, 10, 14, etc. | 3 | 9, 15, etc. | 2 |

The left hand column shows the number of sections available for connecting in parallel which will depend chiefly on the number of poles and phases.

The 2nd, 3rd, 4th and 5th columns give the number of pole pairs on which a given number of parallels can act as primary, when all the coils are connected the same way, for particular values of $n$. Of course the table can be extended to other values of $n$.

The remaining columns of the table give the number of pole pairs upon which the winding will act as a secondary for different values of $r$. If the G. M. C. of $r$ and $p$ is greater than 1, certain of these pole numbers can be obtained with a less number of parallels than that given in the first column; and this number of parallels is indicated in the alternate columns.

If, instead, alternate sections in the group $r$ are reversed, then the $r$ sections, as connected, will be in phase on $n\,r-\dfrac{r}{2}$ pole pairs; for which number of pole pairs the winding will make a satisfactory primary. It will act as a secondary on $n\,r$ pole pairs and in fact on all numbers of pole pairs other than the values of $n\,r-\dfrac{r}{2}$.

It is true generally that any given number of equally spaced parallels can act as secondary on all pole numbers $p$ on which they are not available as primary. Nevertheless if the G. M. C. of $p$ and $r$ is greater than 1 it is possible to use a number of parallels less than $r$ though it is still possible to use the full number $r$. Figures 2 and 5 illustrate the use of 4 and 2 parallels to make up a 4 pole winding. This is very desirable where possible as a small number of turns of large wire is more economical than the converse. Thus for a winding capable of connection into 4 parallels and used as a primary on 4, 8, or 12 pole pairs say, (see table) it is possible as an alternative to use 2 parallels only if it has to operate as a secondary on 6, 10, 14 etc., pole pairs. Similarly a winding capable of 6 parallels and operating as primary on 6, 12 and 18 poles may be joined in 3 parallels only if it operates on 4, 8, 10, 14 etc. pole pairs as secondary.

It should be observed that where a winding is arranged to give several primary pole numbers they must all appear in the 'primary' columns of the table. For instance suppose we wish to design a 6 and 12 pole primary winding (i. e. 3 and 6 pole pairs) capable of use as a secondary also. Glancing through the table we see that 3 and 6 pole pairs together only appear in the case of 3 parallels without relative reversal; and it is impossible to find integral values of $n_1$, $n_2$ and $r$ to satisfy the equations $$n_1 r - \frac{r}{2} = 3$$

$$n_2 r - \frac{r}{2} = 6$$

Hence any winding to give 3 and 6 pole pairs must have 3 parallels. Similarly if we wish to arrange our winding for 2 and 6 poles (1 and 3 pole pairs) we have no choice but to use two parallels relatively reversed. Thus the number of parallels available for windings of multiple primary pole number is rather narrowly restricted even without reference to the secondary. Of course the maximum number of parallels is the number of sections per primary phase.

In some cases however we have a good deal of latitude even with a winding of two primary pole numbers. Consider the case of an 8 pole 3 phase winding having 8 sections per phase. If required for 8 poles (4 pole pairs) only all 8 sections may be in parallel. If required for 8 and 16 poles (4 and 8 pole pairs) then since the S poles have to be reversed as described in connection with Fig. 6 and Fig. 9 referred to below they must be connected so as to be independent of the N poles. Thus we are reduced to 4 parallels by this condition.

We have now to decide further whether it is possible to reduce the number of parallels to 2. This depends on the secondary pole numbers. If it is to operate say on 12 poles only (6 pole pairs) then referring to the line in the table corresponding to 4 sections capable of being paralleled we see that a winding with this number of parallels is capable of operating on 4 and 8 pole pairs as a primary but that a winding with only two parallels is capable of doing so also. Moreover looking at the secondary columns since 6 and 4 have G. C. M. 2 the winding can operate as a secondary on 6 pole pairs with only two parallels. Hence a winding to give 4, 6, 8 pole pairs needs only two parallels. If however we require it to operate on 6 poles as well i. e. to give 3, 4, 6, 8, pole pairs we find that the G. C. M. of 3 and 4 is 1 so that the full 4 parallels will be required.

Figure 10:
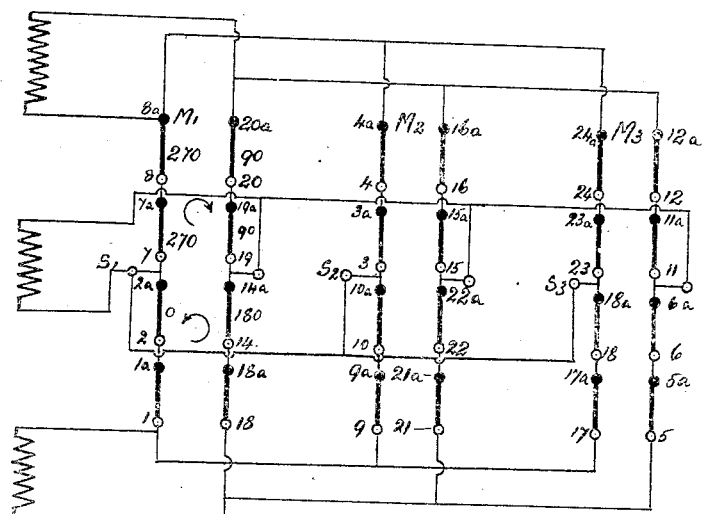

Another case arises when some or all of the secondary pole numbers are to be found in the primary columns of the table, for instance in Figures 9 and 10 we have 2 parallels and 4 main sections per phase (each divided into 2 sub-sections which must be in series as described above). Since there are only 4 sections two of which must be capable of reversal with respect to the other two no more than two parallels can be employed. With two parallels both 2, 4 and 6 pole pairs (4, 8 and 12 poles) are to be found in the primary columns. So that if we are to obtain 12 poles as a secondary pole number it must be by external switching and not by internal connections. Where the combination of pole-numbers and possible numbers of parallels is such that local short circuits are impossible—that is on the secondary pole numbers all the parallels yield the same voltage, it is possible to subdivide each phase which may contain one or several sections in series into a number of portions in series across which E. M. F.'s of different phase will be found. By suitably choosing these portions and short circuiting them either directly or through resistance it is possible to obtain a balanced polyphase system of secondary currents in the sections of the winding as we go round the circumference which will correspond to the required secondary pole number.

Figures 8, 9 and 10 show an example of this, as well as of the sub-division of each main section into two sub-sections which has been described above. We may at first ignore this sub-division and treat the winding as containing 12 main sections 4 per phase. The winding is required to give two N poles and two S poles per phase when operating as a 4 pole primary and four N poles when operating as 8 pole primary. Hence the S poles must be capable of reversal with respect to the N poles and therefor cannot be coupled permanently in parallel with them. Thus the number of parallels cannot exceed two. We see moreover referring to the table that a winding having two parallels not mutually reversed is capable of acting as a primary on 4 and 8 poles and as a secondary on 6 poles.

A convenient arrangement of such a winding to comply with these conditions is shown in Figure 9. Applying the line to terminals $M^1$, $M^2$, $M^3$ all the sections in one phase viz. $\frac{7}{8}$ and 19/20 as well as $\frac{1}{2}$ and 13/14 will be N poles and the winding will give 8 primary poles. If we short circuit the points $M^1$, $M^2$ and $M^3$ and apply the line to the points $S^1$, $S^2$, $S^3$, as may be done by moving the switch so that its contacts engage the contacts $M^1$, $M^2$, $M^3$, $S^1$, $S^2$, $S^3$, resultant sections $\frac{1}{2}$ and 13/14 for instance, will still remain north poles while in sections $\frac{7}{8}$ and 19/20 the current will be reversed and they will therefore be south poles, the winding therefore is converted into a 4 pole winding in which coils are provided corresponding both to the north and to the south poles. Now consider the case when this winding is required to operate on 6 poles as a secondary the parallel sub-sections 1 and 13 2 and 14, for instance, which as we saw were in phase with one another on 4 and 8 poles, will now be opposite in phase, and each such pair will form a short circuited local circuit in the manner described above. It is therefore clear that no difficulty will be experienced in using this winding as a secondary on 6 poles. When we come to 12 poles however the case is different for sections 1 and 13 are in phase on 12 poles as well as on 4 and 8 poles and therefore no short circuited local circuits are formed. In fact referring to the table we see that 12 poles (6 pole pairs) appears as a primary and not a secondary pole number. It is necessary therefore to short circuit the winding by means of extra terminals and switch gear and this can conveniently be done in such a way as to permit resistance regulation. Compare Figure 8 with Figure 9 and we see that the 3 phases $M^1$, $M^2$ and $M^3$, which exist on 4 and 8 poles are all identical in phase on 12 poles, for instance, the parallel sections:—

1 and 13 are in phase with 9 and 21, 5 and 17 respectively.

2 and 14 are in phase with 10 and 22, 6 and 18 respectively.

7 and 19 are in phase with 3 and 15, 11 and 23 respectively.

8 and 20 are in phase with 4 and 16, 12 and 24 respectively.

It is therefore permissible to connect in parallel $M^1$, $M^2$ and $M^3$, and $S^1$, $S^2$ and $S^3$ and also to join in parallel the intermediate points $T^{11}$, $T^{22}$ and $T^{33}$ and also $T^{12}$, $T^{23}$ and $T^{31}$. It is also necessary to join $M^1$, $M^2$ and $M^3$ to the star point. Having done this we are now provided with 4 terminals which we may call M, S, T and $T^1$. These form the terminals of a 4 phase system which may be regulated by means of a 2 phase rheostat Q, R, in the usual way connected across the points M, S, and T, $T^1$.

Thus the above description and diagrams show us how we may escape from the difficulty which arises when one of the secondary pole-numbers appears in the "primary" columns of the table as well as the primary pole-numbers. But this of course is an exceptional case, which would be avoided wherever possible by an appropriate choice of pole numbers, the case illustrated being one of the important examples. In fact a combination of 4, 6, 8, 12 is so often required that we cannot dispense with it in practice. A 6/12 pole rotor winding with 3 parallels and 6 collector rings can readily be made to co-operate with the above winding and presents no special features.

The above description shows how we are compelled to deal with a winding in which other requirements (in this case the requirements of 2 primary pole numbers) prevent us from using a number of parallels suitable to all the secondary pole numbers. Had we been able to use 4 parallels without relative reversal the winding being used solely on 8 poles as a primary both 6 and 12 pole secondary operation could have been provided for as may be seen from the table. With the connection shown those sections, for instance 1, 13, 7, 19, which had they been placed in parallel would have given a balanced local polyphase system (in this case 4 phase on 6 poles and forming two single phase systems on 12 poles) are placed instead in series and the means shown must therefore be adopted to short circuit them. Wherever external means of short circuiting are used it is easy to provide for rheostatic control.

If rheostatic control were desired on the 6 pole speed the connection of the sections in parallel would have to be done by external resistances as shown in Figure 10 and the number of terminals of the machine would be not less than 24.

Where two distinct windings are placed on one member the E. M. F. in any closed circuit of the one induced by the field of the other must be zero. A similar rule has already been laid down for the closed secondary circuits of a winding with respect to its primary pole number; and the devices by which the rule was complied with in the former case apply generally to the case of two windings. But in the case of two windings there is an additional variable of which advantage may be taken; for not only may suitably placed sections be joined to give the desired result, but it may be attained by giving the two windings suitable pitches. For if the pitch of one winding is equal to or a multiple of the double pole pitch of the other, the two bars which together make one turn of one winding will have equal and opposite E. M. F.'s induced in them by the field of the other winding, so that the total E. M. F. around each coil is zero. For instance a 12-pole and an 8-pole winding may be wound on a 48 slot core, the former with a slot pitch 1—13, the latter with a slot pitch 1—17.

As an example of the application of the other methods already described Figures 11 and 12 show the stator windings for a 5-speed motor. Two primary pole numbers, say 6 and 12, are got from a winding such as has already been described which is placed on the rotor and connected to 6 slip rings. On the stator are placed two windings, one adapted to act as a primary on say 8 and 16 poles, the other on 10 poles. In the former opposite sections will be in phase on both primary pole numbers, whereas a field of an odd number of pole pairs will excite opposite E. M. F.'s in opposite sections. So if the 8 and 16 pole winding is built up of pairs of opposite sections joined in series, the 10 pole primary field will produce no current in them even though there be closed local circuits. Such a winding is shown in Figures 12, $M^1$, $M^2$, $M^3$ being connected to the mains for 16 poles, and $S^1$, $S^2$, $S^3$ being connected to the mains and M¹, M², M³ short-circuited for 8 poles. Similarly the 10-pole winding may be built up of pairs of opposite sections joined in series but relatively reversed as shown in Figure 11. The 10 pole winding will serve as a secondary on 6 poles, and the 8 and 16 pole winding as a secondary on 12 poles.

It will be seen that both the method of joining pairs of sections in series in each winding so that they give a resultant voltage of zero when the other winding is excited, and that of giving each winding a pitch equal to two pole pitches (or a multiple thereof) of the other so that the two conductors forming each turn in one winding have opposite voltages whose resultant is zero induced in them when the other winding is excited, are based on the same principle. This principle of course is that of causing the E. M. F. of some conductors in every local circuit to balance that of others whenever the winding is not being used either as a primary or a secondary.

Rheostatic control can be had with the 10-pole winding acting as a secondary if the centre points of the 5 parallels are joined to separate terminals connected with each other through resistances. Rheostatic control can be had on the 12 pole speed by connecting 13ª, 15ª and 17ª to one star point, 19ª, 21ª and 23ª to another star point, and connecting resistances between 4 and 10, 6 and 12, 8 and 14, and the two star points, which are all brought out to separate terminals for the purpose.

By substituting a winding giving 10 and 14 poles such as is described in Patent No. 1,418,779 for the 10 pole winding, a 6 speed motor is obtained. A 7 speed motor with 9 slip rings can be got by using on the rotor a winding giving 6, 12 and 18 poles as described in Patent No. 1,291,424. Or 5 speeds may be obtained from a 10 and 14 pole winding on the rotor, and a stator winding giving three pole numbers say 8, 12 and 16, constructed in accordance with either of the patents mentioned. The considerations which govern the choice of alternative possibilities of this kind are the relative cost of switch gear and of the extra slot space needed for two windings of which only one is in use at any one time.

Another valuable series of windings consists of two-speed two phase windings, giving the same results as Fig. 6 but on two phases, and adaptable to operate as a secondary to a primary winding on another member. Such two speed windings may be made up by joining all pairs of the adjacent sections in series in the manner described in Patent No. 1,418,779 to form half the number of resultant sections having double the number of turns each on the lower pole number, and using all the sections independently on the higher pole number.

A principal advantage of such windings is in one arrangement to retain approximately the same airgap flux (ignoring the effect of the chording of the winding) on both pole numbers by having twice as many sections in series on the higher pole number as there are on the lower (Fig. 13) that is an E. M. F. per section inversely proportional to the pole number; but, where desired, by another arrangement, in which the same number of sections is in series on both pole numbers, the E. M. F. per section is kept the same on both pole numbers, i. e., a weaker flux is got on the lower pole number. Possible arrangements of the winding are shown in Figures 13, 14, and 15.

On the plan described in Patent No. 1,418,779 opposite sections are permanently connected together at one end of each, a terminal being connected to the junction point. If we consider the two sections 1 and 5 they may be connected in either of two ways, the end of 1 shown black, to the end of 5 shown white, or the converse as desired. For a 2 and 4 pole winding this connection will be adopted. If this is done then since 2 poles gives us an odd number of pole pairs 1 and 5 will be opposite in phase and must therefore be connected in parallel, as must all similar pairs. Referring to the table we see that such a winding is available as secondary on even numbers of pole pairs. Since the local circuits are closed by external means, rheostatic control can readily be employed. Following the rule stated above we then connect section 1 in series with its neighbour section 2, at the same time of course connecting 5 and 6. This forms one phase and the other is formed by an exactly similar connection of the pairs of sections 3, 7 and 4, 8. On four poles these pairs of sections must be connected in series and the junction terminal disused. Connecting therefore 1, 5 and 7, 3 (reversed) in series we get one phase having twice as many sections in series as on two poles and connecting in the same way 2, 6 and 8, 4 we get the other phase.

If we wish to have only two sections in series instead of four we have only to put 7, 3 in parallel with 1, 5 and 8, 4 with 2, 6 instead of in series with them (Fig. 15). All these windings will have 12 terminals. The same type of windings are shown in Figs. 16 and 17 which show two different connections of the same winding, Fig. 16 being the connection to be employed for 8 poles and Fig. 17 the connection to be employed for 4 poles. The winding is divided into 16 sections numbered 1 to 16 in consecutive order round the circumference. One end, say the beginning of each section, is denoted by a white circle, and the other end by a black dot. The sections so represented and numbered are connected together as shown and brought out to terminals $M^1$ to $M^{12}$. These terminals are connected in two different ways to give the two different pole numbers, either as shown in Fig. 16 to give 8 poles or Fig. 17 to give 4 poles. It is only necessary to arrange the connections between the terminals to be varied to change the pole number, all other connections as will be seen from the drawings being permanent.

It is clear that the same winding can be adapted to give any number of pairs of poles which are multiples of 4 and 8, for example 16 and 32. This is attained by well known methods, for example, since 16 is 4 times 4 and 32 is 4 times 8, the number of sections instead of being 16 will be 64, and the circumference of the member can be divided into 4 zones each containing 16 sections. In this case, therefore, each section, for example that numbered 1 to $1^a$, must be replaced by 4 sections in series, which would be numbered 1, 17, 33 and 49, one of these sections being taken from each of the 4 zones; similarly the section from 9 to $9^a$ is replaced by 4 sections in series which would be numbered 9, 25, 41 and 57 and the two sets of sections thus formed be connected in parallel. The method of adapting a machine designed for any pole number for multiples of that pole number is well known to those skilled in the art.

Fig. 18 shows the windings of one form of motor according to the present invention.

The motor has one winding on the rotor which is represented by the part A and two windings on the stator represented by the parts B and C of the figure. The winding A on the rotor and the winding B on the stator are three phase windings and the winding C on the stator is a two phase winding. The switches necessary to change from one speed to the other are also illustrated diagrammatically in the figure. The winding B on the stator is a winding of the form illustrated in Fig. 9 of the drawings, and the second winding C on the stator is of the form illustrated in Figs. 16 and 17 of the drawings.

The winding A on the rotor is of the form illustrated in Fig. 6 of the drawings and all these windings have already been fully described. The motor is arranged to run at 4, 6, 8, 12, 16 and 32 poles. The winding B gives 4 and 8 poles as a primary and acts as a secondary on 6 and 12 poles. The star mesh winding A acts as primary on 6 and 12 poles and as secondary on 4, 8, 16 and 32 poles and the two phase winding C acts as primary on 16 and 32 poles and partially as secondary on 6 poles. The connections of the windings are controlled by the switches A, B, C, D, E, F, G, H, I, J. The three phase supply is connected to the terminals $L^1$, $L^2$, $L^3$ and the two phase supply to the terminals $N^1$, $N^2$, $N^3$, $N^4$.

By operating the switches as indicated in the figure, the connections are obtained to produce the necessary arrangement of the windings for the motor to run on any one of the speeds mentioned. In order to arrange the winding C for 16 and 32 poles, each section, for example, that between 1 and $1a$, must be understood to consist of a set of 4 sections connected in series equally spaced round the circumference as is described with reference to Figs. 16 and 17. It is of course obvious that a winding of this type can be adapted for any number of poles. The connection of the winding C are controlled by the switches E, F, G and H and the connections for the windings A and B by the other switches. The switches A and B control the winding A and the switches C, D, I and J control the winding B.

What I claim is:

1. An alternating current dynamo electric machine of variable pole number comprising a stator and rotor, a winding on one member to be connected to a polyphase supply to produce a field of a particular pole number and adapted to act as a secondary in a field of another pole number, a winding on the other member to be connected to a polyphase supply to produce a field of that other pole number and adapted to act as a secondary in the field produced by the winding on the first mentioned member.

2. An alternating current dynamo electric machine of variable pole number comprising a stator and rotor, a winding on one member to be connected to a polyphase supply to produce a field of a particular pole number and adapted to act as a secondary in a field of another pole number, a winding on the other member to be connected to a polyphase supply to produce a field of that other pole number and adapted to act as a secondary in the field produced by the winding on the first mentioned member, one of said windings having a number of sections connected in parallel equal to the total number of evenly spaced sections in which E. M. F.'s of like phase and magnitude are generated on the primary pole number divided by G. C. M. of this number and the number of secondary pole pairs to be produced.

3. An alternating current dynamo electric machine of variable pole number comprising a stator and rotor, a winding on one of said members to be connected to a polyphase supply to produce a field of a particular pole number and adapted to act as a secondary in a field of lower pole number, a winding on the other member divided into a number of sections to be connected to a polyphase supply to produce a field of said lower pole number and connections between points in said winding intermediate the ends of the sections, connected points being of equal potential when the winding is joined to the supply, and said winding being adapted to act as a secondary in the field produced by the winding on the first mentioned member.

4. An alternating current dynamo electric machine of variable pole number comprising a stator and rotor, a winding on one of said members to be connected to a polyphase supply to produce a field of a particular pole number and adapted to act as a secondary in a plurality of fields of different pole numbers, a winding on the other member to be connected to a polyphase supply to produce a plurality of fields of said different pole numbers and adapted to act as a secondary in the field produced by the winding on the first mentioned member.

5. An alternating current dynamo electric machine of variable pole number comprising a stator and rotor, a winding on one of said members to be connected to a polyphase supply to produce a field of a particular pole number and adapted to act as a secondary in a plurality of fields of different pole numbers, a winding on the other member divided into a number of sections to be connected to a polyphase supply to produce a plurality of fields of said different pole numbers and said winding being adapted to act as a secondary in the field produced by the winding on the first mentioned member, and connections between points in one of said windings intermediate the ends of the sections, connected points being of equal potential for all connections of said winding to the supply.

6. An alternating current dynamo electric machine of variable pole number comprising a stator and rotor, a winding on one of said members to be connected to a polyphase supply to produce a field of a particular pole number and adapted to act as a secondary in a plurality of fields of different pole numbers, a winding on the other member divided into a number of sections to be connected to a polyphase supply to produce a plurality of fields of those different pole numbers, and connections between points in one of said windings intermediate the ends of sections, connected points being of equal potential for all connections of said winding to the supply and said connections providing means for arranging the winding to act as a secondary in the field produced by the winding on the other member.

7. An alternating current dynamo electric machine of variable pole number comprising a stator and rotor, a winding on one of said members to be connected to a polyphase supply to produce a field of a particular number of pole pairs, and adapted to act as a secondary in a plurality of fields of different numbers of pole pairs, a winding on the other member divided into a number of sections to be connected to a polyphase supply to produce a plurality of fields of those different numbers of pole pairs and to act as a secondary in the field produced by the winding on the first mentioned member, the particular number of pole pairs being neither an exact multiple nor an exact submultiple of any of the said different numbers of pole pairs, all of said particular and different numbers of pole pairs having a common factor greater than one and sections of said winding equally spaced round a fraction of the circumference of the member equal to the reciprocal of said common factor being joined in parallel.

8. An alternating current dynamo electric machine of variable pole number comprising a stator and rotor, a winding on one of said members to be connected to a polyphase supply to produce a field of a particular pole number and adapted to act as a secondary in a field of another pole number, a winding on the other member to be connected to a polyphase supply to produce a field of that other pole number, external resistances, and means external to the said winding to connect together points in the winding through said resistances to adapt said winding to act as a secondary in the field produced by the winding on the first mentioned member.

9. An alternating current dynamo electric machine of variable pole number comprising a stator and rotor, a winding on one of said members to be connected to a polyphase supply to produce a field of a particular pole number and adapted to act as a secondary in a field of another pole number, a winding on the other member to be connected to a polyphase supply to produce a field of that other pole number, external variable resistances, and means external to the said winding to connect together points in the winding through said resistances to adapt said winding to act as a secondary in the field produced by the winding on the first mentioned member.

10. An alternating current dynamo electric machine of variable pole number comprising a stator and rotor, a winding on one of said members to be connected to a polyphase supply to produce fields of a plurality of different pole numbers and adapted to act as a secondary in fields of a plurality of other pole numbers and on the other member, a winding to be connected to a polyphase electric supply to produce fields of the other pole numbers and adapted to act as a secondary in the fields produced by the winding on the first mentioned member.

11. An alternating current dynamo electric machine of variable pole number comprising a stator and rotor, a winding on one of said members to be connected to a polyphase supply to produce fields of a plurality of different pole numbers and adapted to act as a secondary in fields of a plurality of other pole numbers and on the other member, a winding to be connected to a polyphase electric supply to produce fields of the other pole numbers and adapted to act as a secondary in the fields produced by the winding on the first mentioned member, the winding having fewest primary sections being fitted with equipotential connections to complete circuits for the flow of the secondary currents therein.

12. An alternating current dynamo electric machine of variable pole number comprising a stator and rotor, a plurality of windings on one of said members to be connected to a polyphase supply to produce fields of different pole numbers, one of said windings including closed circuits enabling it to act as a secondary on another pole number, the conductors in said closed circuits being arranged in two sets disposed around the circumference so as to lie in fields of opposite polarity when the other winding on the same member is connected to the line and windings on the other member to co-operate with said windings on the first mentioned member.

13. An alternating current dynamo electric machine of variable role number comprising a stator and rotor, a plurality of windings on one of said members to be connected to a polyphase supply to produce fields of a plurality of pole numbers, and one of said windings adapted to act as a secondary on a further pole number and windings on the other member to be connected to a polyphase supply to produce a field of said further pole number and to act as secondaries in the fields produced by the windings on the first mentioned member.

14. An alternating current dynamo electric machine of variable pole number comprising a stator and rotor, a plurality of windings on one of said members to be connected to a polyphase supply to produce fields of a plurality of pole numbers and adapted to act as secondaries on a plurality of further pole numbers and windings on the other member to be connected to a polyphase supply to produce fields of said further pole numbers and to act as secondaries in the fields produced by the windings on the first mentioned member.

15. An alternating current dynamo electric machine of variable pole number comprising a stator and rotor, a winding on one of said members to be connected to a polyphase supply to produce fields of two pole numbers and adapted to act as a secondary on a third pole number, and a second winding on said member to be connected to a polyphase supply to produce a field of a fourth pole number and windings on the other member to be connected to a polyphase supply to produce a field of the said third pole number and to act as secondaries on the said first, second and fourth pole numbers.

16. An alternating current dynamo electric machine of variable pole number comprising a stator and rotor, a winding on one of said members to be connected to a polyphase supply to produce fields of two pole numbers, a second winding on said member to be connected to a polyphase supply to produce fields of a third and fourth pole number, one of said windings being adapted to act as a secondary on a further pole number and windings on the other member to be connected to a polyphase supply to produce a field of the pole number on which the winding of the first member acts as a secondary and to act as secondaries on said first, second, third and fourth pole numbers.

17. An alternating current dynamo electric machine of variable pole number comprising a stator and rotor, a winding on one of said members divided into sections, means for connecting said sections to enable the winding to produce a field of given pole number on connection to a polyphase supply, means for varying the connections of said sections to enable said winding to act as a secondary on another pole number and windings on the other member to be connected to polyphase supply to produce a field of said second pole number and to act as a secondary on the first pole number.

18. An alternating current dynamo electric machine of variable pole number comprising a stator and rotor, a winding on one of said members divided into sections means for connecting said sections to enable the winding to produce a field of given pole number on connection to polyphase supply, external resistances, means for connecting said sections through the resistances to enable the winding to act as a secondary on another pole number and windings on the other member to be connected to polyphase supply to produce a field of said second pole number and to act as a secondary on the first pole number.

19. An alternating current dynamo electric machine of variable pole number comprising a stator and rotor, a winding on one of said members to be connected to a polyphase supply and divided into sections, means for connecting said sections into a net work of star type for producing a field of given pole number of which net work each arm includes a plurality of parallels, said net work having as many star points as there are parallels, each star point being a junction of one parallel of each arm, resistances, means for joining said star points together through said resistances to adapt the winding to act as a secondary on another pole number and windings on the other member to be connected to a polyphase electric supply to produce a field of that pole number and to act as a secondary upon the first mentioned pole number.

20. An alternating current dynamo electric machine of variable pole number comprising a stator and rotor, a winding on one of said members to be connected to a polyphase supply and divided into sections which are connected to form at least three parallels per phase when the winding acts as a primary and said parallels being the seat of a balanced polyphase system of currents when the winding acts as a secondary and windings on the other member to be connected to a polyphase supply to produce a field of said secondary pole number and to act as a secondary on said primary pole number.

21. An alternating current dynamo electric machine of variable pole number comprising a stator and rotor, a two phase winding on one of said members divided into sections connected together in pairs of sets joined in series with a junction terminal, each set containing a number of equally spaced sections equal to the lowest number of primary pole pairs, means for connecting pairs of adjacent sections in series to adapt the winding to produce a field of given pole number on connection to a two phase supply, means for alternatively connecting adjacent sections of the winding to phases in quadrature to produce a field of twice that pole number on connection to the two phase supply, and windings on the other member adapted to co-operate with said windings on the first member.

In testimony whereof I have signed my name to this specification.

FREDERICK CREEDY